United States Patent [19]

Shiraishi et al.

[11] Patent Number: 4,855,814
[45] Date of Patent: Aug. 8, 1989

[54] VIDEO CAMERA BODY AND DETACHABLE LENS EACH CONTAINING A MEMORY FOR STORING SIGNALS INDICATIVE OF SPECTRAL CHARACTERISTICS

[75] Inventors: Akihiko Shiraishi, Kawasaki; Masatake Kato, Kunitachi; Kenichi Kawamoto, Komae, all of Japan

[73] Assignee: Canon Kabushiki Kaisha, Tokyo, Japan

[21] Appl. No.: 212,050

[22] Filed: Jun. 24, 1988

Related U.S. Application Data

[63] Continuation of Ser. No. 916,212, Oct. 7, 1986, abandoned.

[30] Foreign Application Priority Data

Oct. 9, 1985 [JP] Japan ................ 60-226569
Oct. 11, 1985 [JP] Japan ................ 60-227513

[51] Int. Cl.⁴ ............ H04N 9/73; H04N 5/225; H04N 5/232; H04N 9/04
[52] U.S. Cl. ............ 358/29; 358/41; 358/55; 358/209; 358/225
[58] Field of Search ........ 358/29, 41, 43, 50, 358/51, 55, 225, 909, 29 C, 44, 209; 354/286, 412

[56] References Cited

U.S. PATENT DOCUMENTS

| | | | |
|---|---|---|---|
| 3,872,499 | 3/1975 | McConnell et al. | 358/51 |
| 4,118,713 | 10/1978 | Murakami et al. | 354/286 |
| 4,472,740 | 9/1984 | Doi | 358/55 |
| 4,477,161 | 10/1984 | Kawasaki et al. | 354/286 |
| 4,529,288 | 7/1985 | Nakai et al. | 354/286 |
| 4,782,355 | 11/1988 | Sakai et al. | 354/412 |

FOREIGN PATENT DOCUMENTS

| | | | |
|---|---|---|---|
| 3232920 | 3/1984 | Fed. Rep. of Germany | 358/51 |
| 57-42286 | 3/1982 | Japan | 358/51 |
| 57-193193 | 11/1982 | Japan | 358/51 |
| 58-114586 | 7/1983 | Japan | 358/41 |
| 58-130686 | 8/1983 | Japan | 358/51 |
| 59-101974 | 6/1984 | Japan | 358/41 |
| 60-4391 | 1/1985 | Japan | 358/29 C |
| 60-4392 | 1/1985 | Japan | 358/29 C |
| 60-218995 | 11/1985 | Japan | 358/29 C |
| 60-254894 | 12/1985 | Japan | 358/29 C |

Primary Examiner—Howard W. Britton
Assistant Examiner—Randall S. Svihla
Attorney, Agent, or Firm—Robin, Blecker & Daley

[57] ABSTRACT

An image pickup system includes a camera body having an image conversion device and a signal processor and a detachable lens including a memory and circuitry for transmitting the memory contents to the camera body signal processor. In one embodiment, the system provides for storage in the lens memory of the spectral characteristics of both the lens and the image conversion device. In a second embodiment, the system provides for storage of spectral characteristic data concerning a plurality of different lenses in memory in the camera body, with the lenses adapted for self-identification. In a third embodiment, camera body memory stores a signal lens spectral characteristic for use in common with any one of plural lenses and representative of all such lenses.

34 Claims, 5 Drawing Sheets

VIDEO CAMERA BODY AND DETACHABLE LENS EACH CONTAINING A MEMORY FOR STORING SIGNALS INDICATIVE OF SPECTRAL CHARACTERISTICS

This application is a continuation of application Ser. No. 916,212, filed Oct. 7, 1986, now abandoned.

BACKGROUND OF THE INVENTION

1. Field of the Invention

This invention relates to video cameras having means for adjusting the color balance of the color video signals, and interchangeable lenses adapted to be used with such video camera.

2. Description of the Related Art

In the video camera or the like, the adjustment of the white balance of the color video signal has been made by setting forth the most standard spectral characteristic out of those of the commonly available photographic lenses, and on the basis of the color temperature information derived from the preset spectral characteristic and the nature of the light from an object to be photographed.

However, when the standard lens of the conventional video camera is interchanged by another one whose spectral characteristic is largely different from that of the standard lens, a problem arises that even for the same object, the white balance cannot be well adjusted. To eliminate such a problem, there has already been proposed a technique that the information of the spectral characteristic of the interchangeable lens is memorized in, for example, a ROM or other suitable memory means positioned in the casing of the interchangeable lens, and, to adjust the white balance, is read out and transmitted to the camera body, in U.S. patent application Ser. No. 861,876 filed May 12, 1986, and assigned to the assignee of the present invention.

By the way, the image pickup system of the video camera is included with, for example, an IR cut filter or an optical low pass filter that functions to prevent formation of folded strain in the output of the image pickup element, and a color filter in front of the image pickup element. Such filters have no ideal spectral characteristics. For example, the IR cut filter blocks not only the infrared light component of the incident light but also a large fraction of the red color component. In actual practice, therefore, this fraction must be compensated for by modifying the spectral characteristic of the image pickup system of the video camera.

SUMMARY OF THE INVENTION

A first object of the invention is to eliminate the above-described problems and to provide a video camera having an interchangeable lens with means enabling whatever interchangeable lens to be used while still permitting good adjustment of color balance, and an interchangeable lens suited for such a video camera.

A second object is to provide a video camera having an interchangeable lens and capable of properly adjusting the color balance regardless of what spectral characteristic the image pickup system has.

Under the objects described above, according to a first preferred embodiment of the invention, a system is disclosed in which, in application to the video camera whose photographic lens is interchangeable and in which the light entering through the photographic lens and the image pickup system is converted to electrical signals, the aforesaid photographic lens has memory means for storing the peculiar spectral characteristic of the lens and the spectral sensitivity characteristic of the image pickup system in the form of the total spectral characteristic, readout means for obtaining information representing the memorized total spectral characteristic in the memory means, and means for controlling the white balance in accordance with the readout information.

Also, under the above-described objects, according to a second preferred embodiment of the invention, a system is disclosed in which, in application to the video camera whose photographic lens is interchangeable and in which the light entering through the photographic lens and the image pickup system of the camera body is converted to electrical signals, the aforesaid photographic lens has first memory means for storing information corresponding to the spectral characteristic peculiar to the lens, and the camera body has second memory means for storing a corresponding information to the spectral characteristic of the image pickup system of the camera body, means for reading out the information stored in the first and second memory means, and means for controlling the white balance in accordance with the readout two informations.

Other objects of the invention will become apparent from the following description of embodiments thereof by reference to the accompanying drawings.

DETAILED DESCRIPTION OF THE PREFERRED EMBODIMENTS

Figure 1:
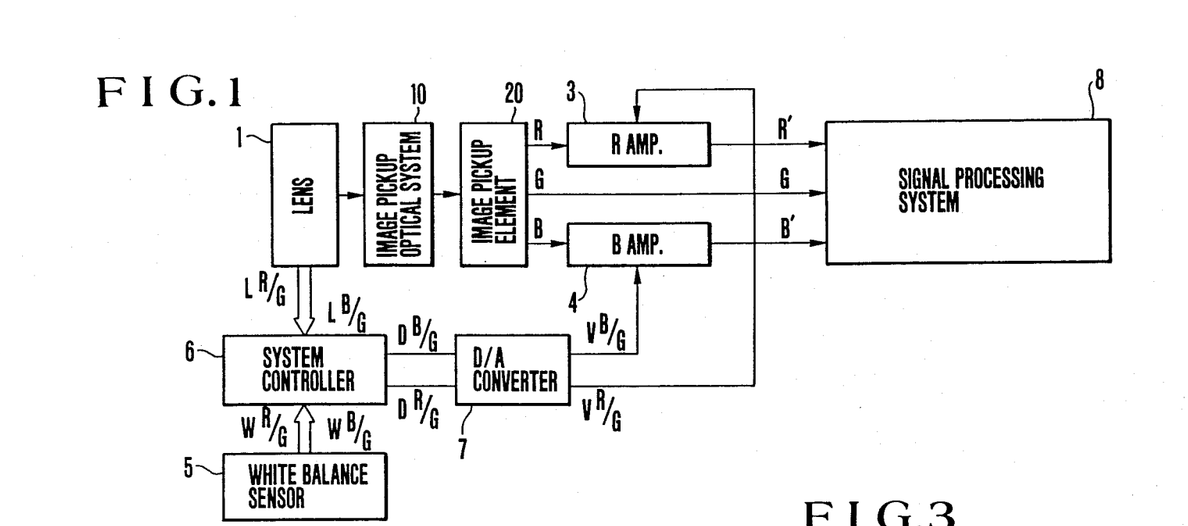
FIG. 1 is a block diagram of an embodiment of the video camera according to the present invention.

In FIG. 1 there is shown one embodiment of the video camera according to the present invention. A photographic lens 1 has a function of memorizing color informations corresponding to the spectral characteristic thereof. An image pickup element 20 converts an image formed with light entering through the lens 1 to electrical signals. The red and blue signals from the image pickup element 20 are amplified by amplifiers 3 and 4 respectively. An automatic follow type sensor 5 for white balance is able to detect the color temperature of the light source and is arranged to receive the ambient light of the image pickup device after having been averaged through a neutral filter. A system controller 6 receptive of the data sent from the lens 1 and the sensor 5 produces an output for controlling the gains of the R and B amplifiers 3 and 4 in digital form of the control voltage $D^R/_G$, $D^B/_G$ respectively. The digital values of the control voltage $D^R/_G$ and $D^B/_G$ are converted to analog values $V^R/_G$ and $V^B/_G$ by a D/A converter 7. From the color-balance-adjusted signals R', G, and B' by the R and B amplifiers 3 and 4 are obtained prescribed signals by a signal processing system 8. An image pickup optical system 10 conducts a bundle of light coming from the lens 1 to the image pickup element 20. It is to be noted that the image pickup optical system 10 corresponds to a low pass filter, an IR cut filter or a color filter.

Figure 2:
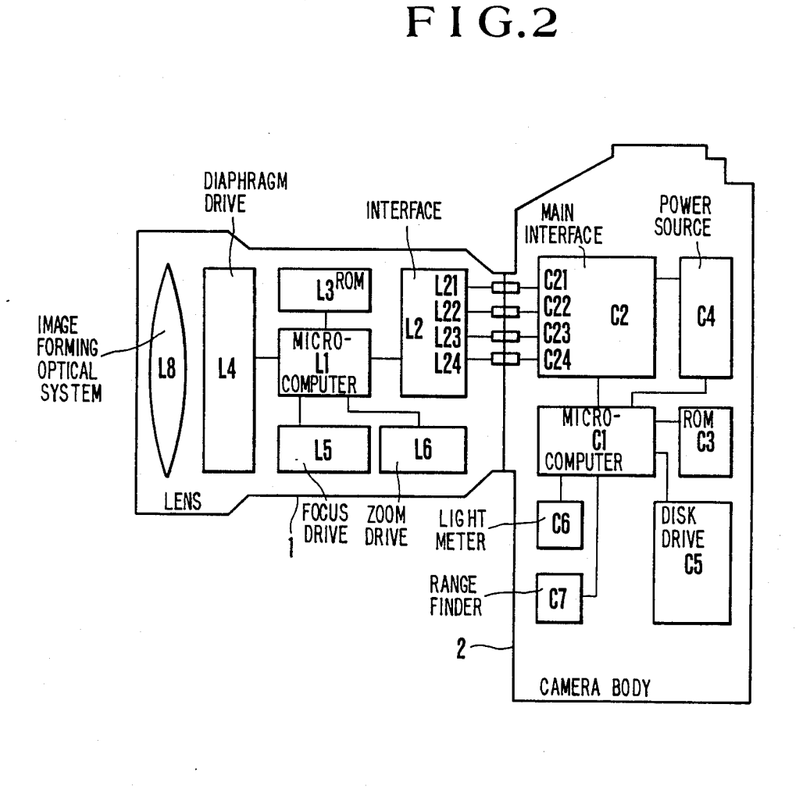
FIG. 2 is a block diagram provided to explain how to communicate informations between the photographic lens 1 and the camera body 2.

Next, FIG. 2 is a block diagram of the photographic lens 1 and the camera body 2 for the purpose of explaining the communication method of the photographic lens 1 and the camera body 2 in the embodiment illustrated in FIG. 1. In the drawing, the camera body 2 contains a microcomputer C1, a main interface C2 having an electrical power output terminal C21, a data terminal C22, a busy terminal C23 and a GND terminal C24, a ROM C3 programmed for the main microcomputer C1, an electrical power source C4, a disc drive mechanism C5 for use in recording images, a light meter C6 and a range finder C7. The photographic lens 1 is releasably attached to the camera body 2, and contains a microcomputer L1, an interface L2 having an electrical power source terminal L21, a data terminal L22, a busy terminal L23 and a GND terminal L24, a ROM L3 in which various informations of the lens 1 and a sub-microcomputer program are stored, a diaphragm drive system L4, a focus drive system L5, and a zoom drive system L6. L8 is an image forming optical system arranged to be driven by the focus and zoom drive systems L5 and L6.

Figure 3:
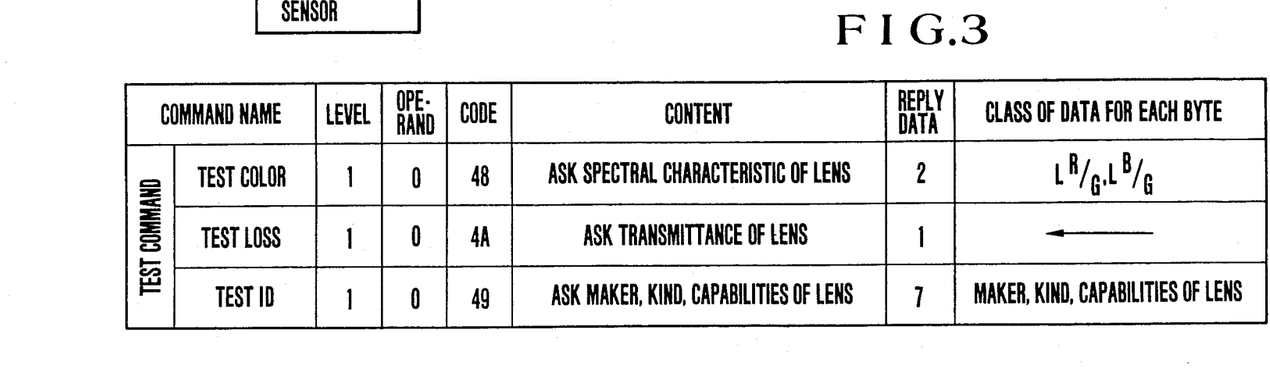
FIG. 3 is a table of commands and data transmitting between the lens 1 and camera body 2.

Next, we explain about the various informations of the lens 1 programmed in the ROM L3 in the lens 1, using FIG. 3. In the table of FIG. 3 there are lists of commands which are sent from the camera body 2 to the photographic lens 1 through the data line C22-L22, codes for the commands, the contents of the commands, the numbers of bytes of the data which are sent from the lens 1, and the classes of data assigned to the bytes. For note, the symbol "←" in the column of the classes of data represents a similar content to that of the content in the same line.

Here, the content to be read out by the command named "Test Color" is the spectral characteristic of the lens, and is formed by 2-byte data representing $L^R/_G$, $L^B/_G$ obtained by the ratios of the transmittances of the R, G and B of the light through the lens. The content to be read out by the command named "Test Loss" is the data representing the transmittance of the lens 1. The content to be read out by the command "Test ID" is the data representing the maker, kind and capabilities of the lens each designed to a suitable number of bytes, in total 7 bytes.

Here, we explain in more detail about the data to be read out by the command "Test Color".

This data is of the form:

$$L^R/_G = \frac{Cr/Cg}{Cr'/Cg'} \quad (1)$$

-continued $$L^B/_B = \frac{Cb/Cg}{Cb'/Cg'}$$

wherein $$Cj = \int R(\lambda) I(\lambda) \tau_L(\lambda) \tau_F(\lambda) \tau_j(\lambda) S(\lambda) d\lambda$$

$$Cj' = \int R(\lambda) I(\lambda) \tau'_L(\lambda) \tau_F(\lambda) \tau_j(\lambda) S(\lambda) d\lambda$$

$$(j = r, g, b)$$

where
$R(\lambda)$: the spectral reflectance of an object defined as the standard;
$(\lambda)$: the spectral intensity of a standard light source;
$\tau_L(\lambda)$: the spectral transmittance of the photographic lens 1;
$\tau'_L(\lambda)$: the spectral transmittance of a lens taken as the standard;
$\tau_F(\lambda)$: the spectral transmittance of any filter except the color separation filters such as the IR cut filter, low pass filter and other required filters in the camera body;
$\tau_j(\lambda)$: the spectral transmittance of the R, G or B color separation filter with the subscripts of j=r for the red filter j=g for the green filter and j=b for the blue filter (if the color separation filters are not of the RGB type, they must be converted into RGB values in accordance with the algorithm in the signal processing circuit); and
$S(\lambda)$: the spectral sensitivity of the image pickup element (for example, image pickup tube or solid state image pickup element).

That is, such data Cr, Cg and Cb are the R, G and B outputs obtained from the image pickup element through the photographic lens 1, the image pickup system of the camera body 2 or the IR cut filter, low pass filter, RGB color separation filters and other various filters in the camera body when a standard white object is illuminated with light radiating from a standard white light source.

Also, the data Cr', Cg' and Cb' are the R, G and B outputs obtainable from the image pickup element when the aforesaid photographic lens 1 is replaced by the lens defined as the standard.

Therefore, the data $L^R/_G$, $L^B/_G$ obtained by executing "Test Color" are the ratios of the values $^R/_G$, $^B/_G$ obtained by using the photographic lens to the values $^R/_G$, $^B/_G$ obtained by using the standard lens.

In other words, such data $L^R/_G$, $L^B/_G$ has the form of having taken into account not only the photographic lens 1 but also the image pickup system in the camera body 2 when the spectral characteristic is considered.

The memorization of the $L^R/_G$, $L^B/_G$ described above in the photographic lens 1 produces the following advantage.

Since the corresponding data to the total spectral characteristic including that of the image pickup system in the camera body 2 is memorized in the photographic lens 1, it is not necessary for the camera body to memorize any spectral characteristic of the image pickup system.

Next, we explain another embodiment about the spectral characteristic information which does not depend on the spectral characteristic of the camera body 2 but depends only on the photographic lens 1 and is memorized in the photographic lens 1, while in the camera body 2, the information of the spectral characteristic of the camera body 2 is memorized.

In the case of such an embodiment, the content to be read out by the command "Test Color" is the spectral characteristic of the photographic lens and is formed from the data of 2 bytes representing the $L^R/_G$, $L^B/_G$ from the ratios of R, G and B of the light passing through the lens.

Here we explain in more detail about the data to be read out by the "Test Color".

The data to be read out by the "Test Color" is shown below. That is, $$L^R/_G = \frac{cr/cg}{cr'/cg'} \qquad (1)$$

$$L^B/_G = \frac{cb/cg}{cb'/cg'}$$

wherein $$cj = \int I(\lambda) \tau_L(\lambda) \tau_j(\lambda) d\lambda \qquad (2)$$

$$cj' = \int I(\lambda) \tau'_L(\lambda) \tau_j(\lambda) d\lambda$$

$$(j = r, g, b)$$

where
- $I(\lambda)$: the spectral intensity of the standard light source;
- $\tau_L(\lambda)$: the spectral transmittance of the photographic lens 1;
- $\tau'_L(\lambda)$: the spectral transmittance of a photographic lens chosen as the standard;
- $\tau_j(\lambda)$: the spectral transmittance of the RGB 3-color separation filter chosen as the standard with the subscription of j=r for the red filter, j=g for the green filter and j=b for the blue filter.

That is, such data cr, cg and cb are the data of light energy obtained through the photographic lens 1 and the color separation filters having spectral transmittances chosen as the standard which are positioning virtually in the camera body 2, when a standard white light source radiates foreside of the photographic lens 1.

Also, the data cr', cg' and cb' are the data of light energy when the standard lens is in use instead of the photographic lens 1.

Therefore, in this embodiment, the data $L^R/_G$, $L^B/_G$ obtainable by executing the "Test Color" command are the ratios of the values $R/_G$, $B/_G$ in light energy resulting from the use of the photographic lens 1 to the values $R/_G$, $B/_G$ in light energy resulting from the use of the standard lens.

In other words, such data $L^R/_G$, $L^B/_G$ in this embodiment are the data which does not take into account the spectral characteristic of the camera body but have taken into account the spectral characteristic of the photographic lens 1 only.

Next, we explain about information of the spectral characteristic of the image pickup system of the camera body memorized in the ROM C3 of the camera body 2.

In addition to the data $L^R/_G$, $L^B/_G$ representing the spectral characteristic of the photographic lens 1 memorized in the photographic lens 1, the data $<R/_G>'$, $<B/_G>'$ representing the total spectral characteristic to be described later including the spectral characteristic of the photographic lens 1 and the spectral characteristic of the image pickup system and still the sensitivity of the image pickup element of the camera body are required. They are represented by the data $C^R/_G$, $C^B/_G$ expressed below, which are memorized in the ROM C3 of the camera body 2.

That is:

$$C^R/_G = \frac{<R/_G>'}{L^R/_G} \qquad (3)$$

$$C^B/_G = \frac{<B/_G>'}{L^B/_G}$$

Here, the total spectral characteristics $<R/_G>'$, $<B/_G>'$ of the photographic lens 1 and the image pickup system of the camera body even with inclusion of the sensitivity of the image pickup element are expressed as follows:

$$<R/_G>' = \frac{Cr/Cg}{Cr'/Cg'} \qquad (4)$$

$$<B/_G>' = \frac{Cb/Cg}{Cb'/Cg'}$$

wherein $$Cj = \int R(\lambda) I(\lambda) \tau_L(\lambda) \tau_F(\lambda) \tau_j(\lambda) S(\lambda) d\lambda \qquad (5)$$

$$Cj' = \int R(\lambda) I(\lambda) \tau'_L(\lambda) \tau_F(\lambda) \tau_j(\lambda) S(\lambda) d\lambda$$

$$(j = r, g, b)$$

where
- $R(\lambda)$: the spectral reflectance of an object defined as the standard;
- $I(\lambda)$: the spectral intensity of a standard light source;
- $\tau_L(\lambda)$: the spectral transmittance of the photographic lens 1;
- $\tau'_L(\lambda)$: the spectral transmittance of a lens taken as the standard;
- $\tau_F(\lambda)$: the spectral transmittance of any filter except the color separation filters such as the IR cut filter, low pass filter and other required filter in the camera body;
- $\tau_j(\lambda)$: the spectral transmittance of the RGB color separation filter with j=r for the red, j=g for the green,, and j=b for the blue filter. (If the color separation filter of the camera is not of the RGG type, they must be converted into R, G and B values in accordance with the algorism in the signal processing circuit; and
- $S(\lambda)$: the spectral sensitivity of the image pickup element (for example, the image pickup tube, or solid state image pickup element) of the camera body.

Such data Cr, Cg and Cb are the RGB outputs obtainable from the image pickup element through the photographic lens 1 and the image pickup system of the camera body 2, or the various filters such as the IR cut filter and low pass filter and the RGB color separation filters, when the object of white color set as the standard is illuminated with light radiating from the light source of white color set as the standard.

Also, the data Cr', Cg' and Cb' are the R, G and B outputs obtainable from the image pickup element when a lens chosen as the standard is used instead of the aforesaid photographic lens.

Therefore, the total spectral characteristics $<R/_G>'$, $<B/_G>'$ of the lens 1 and the camera body 2 inclusive represent the ratios of the values $R/_G$, $B/_G$ of the RGB outputs obtainable when the photographic lens 1 is in use to the values $^R/_G$, $^B/_G$ of the RGB outputs obtainable when the standard lens is in use.

As has been described above, such data $<^R/_G>'$, $<^B/_G>'$ have the form of having taken into account the spectral characteristics of the photographic lens 1 and the image pickup system in the camera body 2 with inclusion of the image pickup element.

By the way, when the informations $C^R/_G$, $C^B/_G$ representing the spectral characteristics of the image pickup system and the image pickup element of the camera body 2 are memorized in the ROM C3 of the camera body 2, as will be understood from the foregoing description, all the corresponding informations to the lenses to be used must be memorized.

Because, in this embodiment, an equal number of values of the $C^R/_G$, $C^B/_G$ to the number of kinds of photographic lenses 1 must be previously memorized in the ROM C3 of the camera body 2, what kind of the photographic lens 1 is in use is read out from the photographic lens 1 when the camera body 2 requests by sending the aforesaid command "Test ID" to the photographic lens 1. Depending on the reply, one of the number of the values of the $C^R/_G$, $C^B/_G$ stored in the ROM C3 is selected.

However, there is a method by which the memory capacitance of ROM C3 can be reduced. That is, the use of the method of selecting one typical value of the $C^R/_G$, $C^B/_G$ out of several values of the $C^R/_G$, $C^B/_G$ stored in response to the kind of the lens. This method produces an advantage that as compared with the case of memorizing the informations $<^R/_G>'$, $<^B/_G>'$ of the total spectral characteristic in the ROM C3 of the camera body 2. In more detail, $<^R/_G>'$, $<^B/_G>'$ vary largely depending on the kind of the lens. When to memorize $<^R/_G>'$, $<^B/_G>'$, because the data for all interchangeable lenses must be stored, the memory capacitance is necessarily large. But, the value of $C^R/_G$, $C^B/_G$ varies less than $<^R/_G>$, $<^B/_G>$ depending on the kind of lenses, so that only one in number is necessary for a plurality of kinds of interchangeable lenses. Therefore, so much large memory capacitance is not required.

This embodiment, as compared with the above one, needs to memorize in the camera body the spectral characteristic information of the camera body. But, it has the advantage that the information independent of the camera body can be memorized in the photographic lens.

Figure 4:
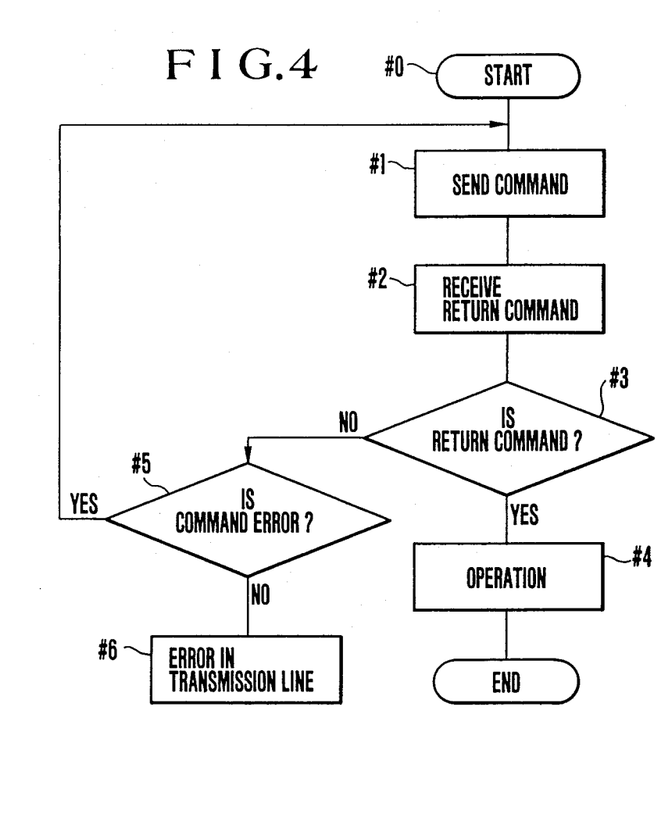
FIG. 4 is a flow chart of the microcomputer C1 in the camera body 2.
Figure 5:
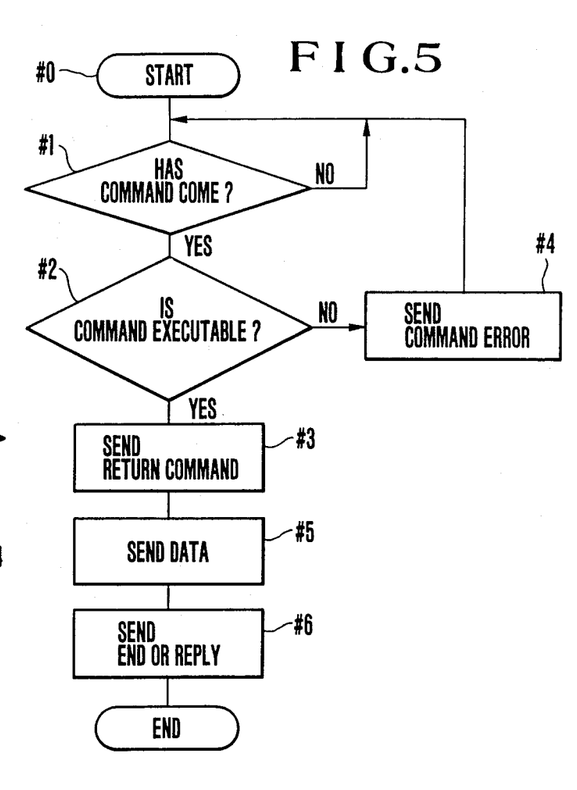
FIG. 5 is a flow chart of the microcomputer L1 in the photographic lens 1.

Next, we explain about the order of transmission of the commands and data shown in FIG. 3 between the camera body 2 and the lens 1 by using FIGS. 4 and 5. The flow chart of FIG. 4 is executed by the microcomputer C1 of the camera body 2, while the flow chart of FIG. 5 is executed by the microcomputer L1 of the lens 1.

As the operation of the camera body 2 starts, the flow begins with a step #0 in FIG. 4, and advances to the next step #1 where one of the commands shown in FIG. 3 is sent from the camera body 2 to the lens 1. Meanwhile, when the lens 1 starts to operate, the flow of FIG. 5 begins with a step #0 and advances to a step #1 where whether or not any command has been transmitted from the camera body 2 to the lens 1 is examined. If no command is received, the loop is repeated. When a command is received, the flow advances to a step #2. Therefore, responsive to execution of the step #1 of FIG. 4, the microcomputer L1 advances the flow of FIG. 5 from the step #1 to #2. The lens 1 examines whether or not the received command in the step #2 of FIG. 5 can be executed. If so, the flow of FIG. 5 advances to a step #3, and if not, to a step #4.

Here, in the step #3 in FIG. 5, the command transferred from the camera body 2 to the lens 1 is transferred itself backward (return command) from the lens 1 to the camera body 2. After the step #3 of FIG. 5 has been performed, the lens 1 executes that command and then sends the data that are specified by the command to the camera body 2 (step #5 in FIG. 5). Also, in the step #4 of FIG. 5, the data representing "command error" is sent to the camera body 2. The above-described steps #2 to #5 can otherwise be said to constitute a flow that if the command transferred from the camera body 2 to the lens 1 is executable, the lens 1 sends the received command without any alteration to the camera body 2, and if the command transferred from the camera body 2 to the lens 1 is not executable, the lens 1 sends to the camera body 2 "command error" representing that the transferred command is not executable. Hence, as has been shown in FIG. 4 at the step #2, the camera body 2 is ready for receiving the command to be transferred from the lens 1. As the lens 1 performs the step #3 or the step #4 of FIG. 5, the camera body 2 receives the data transferred from the lens 1 to the camera body 2.

Then, the camera body 2 examines whether or not the data transferred from the lens 1 to the camera body 2 coincides with the command that was sent to the lens 1 in the step #1 of FIG. 4 when the step #3 of FIG. 4 is performed. Here, if in coincidence, the subsequently sent data are received by the camera body 2 as shown in the step #4 of FIG. 4, and, in the step #4, are subjected to the operation. Thus, the flow comes to the end. If not in coincidence, the flow of FIG. 4 jumps from the step #3 to #5 where whether or not the data transferred from the lens 1 to the camera body 2 is the same as the data representing "command error". Then, if the transferred data are determined to be "command error", the flow of FIG. 4 returns again to the step #1 and the same command is selected to send. If "command error" is not found in the step #5 of FIG. 4, there would have occurred an accident of transferring either an erroneously different command from the intended one from the camera body 2 to the lens 1, or an erroneously different data from the intended one from the lens 1 to the camera body 2. In either case, because this error is due to the transmission line, the flow stops there.

Returning now to FIG. 1, as such a process as described by using FIGS. 2 to 5 has been carried out, the data of $L^R/_G$, $L^B/_G$ representing the spectral characteristic of the lens and the image pickup element of the camera body transferred from the lens 1 to the camera body 2 are put into the system controller 6 where they are computed with the data $W^R/_G$, $W^B/_G$ supplied from the sensor 5 for white balance. The outputs $D^R/_G$, $D^B/_G$ of the system controller 6 are applied to the D/A converter 7 which then produces gain-control signals for the R and B amplifiers 3 and 4 in the form of voltages $V^R/_G$, $V^B/_G$. Thus, the white balance is corrected by taking into account even the spectral characteristic of the lens.

For note, as has been described in the second embodiment of the invention, for the case of memorizing the data corresponding only to the spectral characteristic of the lens, it is after the data of $L^R/_G$, $L^B/_G$ are multiplied by the $C^R/_G$, $C^B/_G$ read out from the ROM C3, that the data $W^R/_G$, $W^B/_G$ from the sensor 5 for white balance are added to the data of the total spectral characteristic.

Therefore, according to the first and second embodiments of the invention, the white balance can be always correctly adjusted, not depending on the spectral characteristics of the lens 1 and the image pickup system of the camera body 2.

Figure 6:
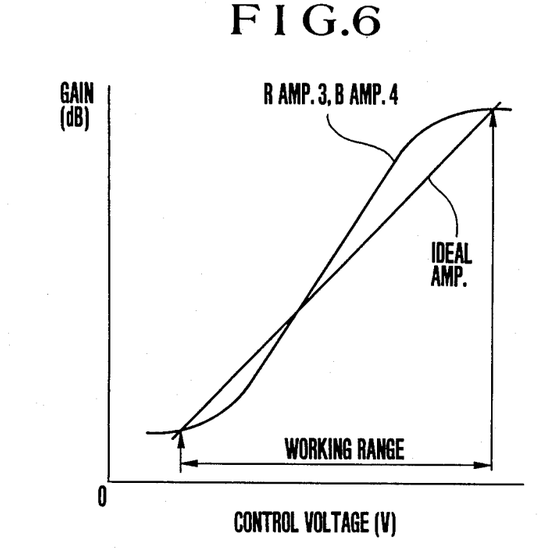
FIG. 6 is a graph illustrating the relationship of the gains of the R and B amplifiers 3 and 4 of FIG. 6 with the control voltage.

By the way, in the process described in connection with FIG. 1, if the range of variation of the control voltage for the gains of the R and B amplifiers 3 and 4 is extended, the linearity of the relationship of the gains of the R and B amplifiers 3 and 4 to the control voltage will not hold in the extended regions. This is because, as shown in FIG. 6, the gain of the amplifier tends to saturate against the increase of the control voltage. By such saturation, the gains of the R and B amplifiers 3 and 4 are caused to deviate from the ideal ones for good adjustment of the white balance, thus introducing an error into the process. As a result, a problem arises that the white balance is broken.

To eliminate this problem, the system controller 6 must otherwise be constructed so that, in the information either of the total spectral characeristic of the lens and the camera body transferred from the lens 1 in the first embodiment of the invention, or of the multiplication of the spectral characteristic of the lens 1 transferred from the lens 1 by the spectral characteristic of the camera body 2 in the second embodiment of the invention, is combined with the information supplied from the sensor 5 for white balance to compute the gains of the R and B amplifiers 3 and 4, and the thus-obtained gain $^R/_{G'}$, $^B/_{G'}$ are used for deriving the control voltage $V^B/_G$, $V^R/_G$ by taking into account the characteristics of the R and B amplifiers 3 and 4 shown in FIG. 6.

Figure 7:
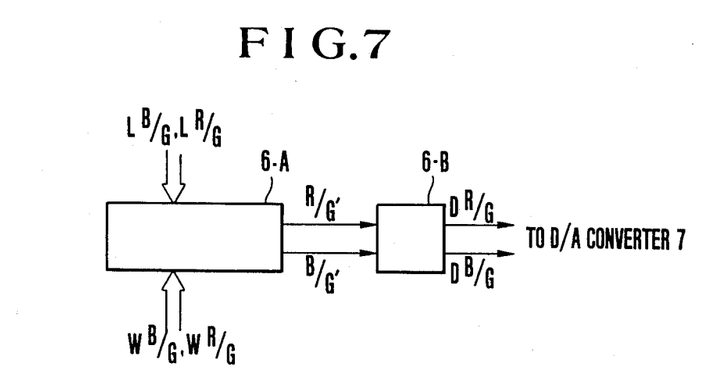
FIG. 7 is a block diagram of the system controller 6 which takes into account the characteristics of the R and B amplifiers 3 and 4 of FIG. 6.

The provision of such a function is made in the system controller 6 shown in FIG. 7, where an adding circuit 6-A receptive of the data $L^R/_G$, $L^B/_G$ transferred from the lens 1 in the first embodiment or of the multiplied result of the spectral characteristic transferred from the lens 1 and the spectral characteristic of the camera body 2 in the second embodiment and of the data $W^R/_G$, $W^B/_G$ supplied from the sensor 5 for white balance produces the outputs $^R/_{G'}$ and $^B/_{G'}$ which are then processed by taking into account the control voltage-gain characteristics of the R and B amplifiers 3 and 4 to obtain the corresponding digital values to the proper control voltages by a converter 6-B.

The use of the adding circuit 6-A and the converter 6-B enables the control voltage—response gain characteristics of the R and B amplifiers 3 and 4 to be taken into account in obtaining the control voltage values.

By the way, according to the embodiments described above, the white balance adjustment can be performed without being affected by the spectral characteristic of the lens. But, for some lenses, the correction factor for the spectral characteristic of the lens must be changed depending on the color temperature of the light source.

Figure 8:
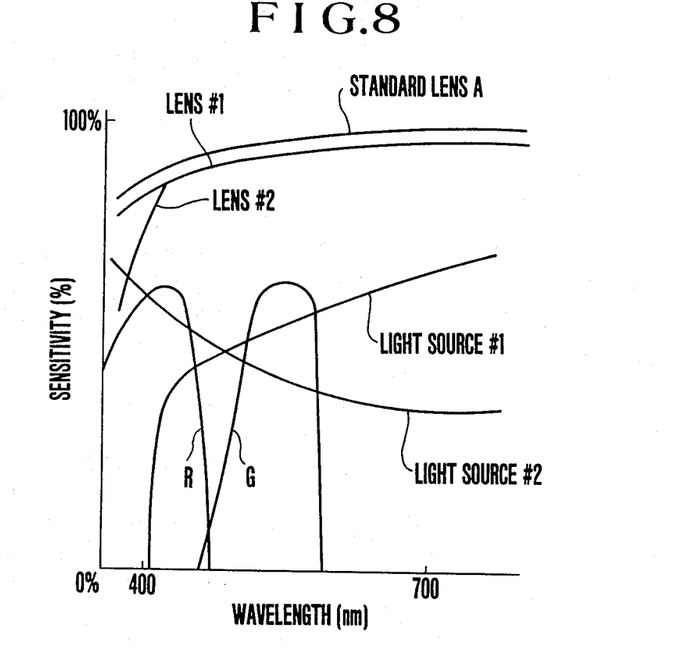
FIG. 8 is a graph illustrating the spectral characteristics of light sources #1 and #2, R and G color filters, and lenses #1 and #2.

This should be explained by using FIG. 8. In FIG. 8, the light sources #1 and #2 represent the distributions of light sources of different color temperature, the R and G represent the transmittance characteristics of the red and green filters respectively positioned in front of the sensor for white balance, and the standard lens A and lenses #1 and #2 represent the spectral characteristics of the three lenses. Here, for example, the lens #1 whose spectral characteristic is almost the same as that of the standard lens A has no necessity of employing a different value of the correction factor from that of the correction factor of the standard lens A (that has no necessity of correcting the spectral characteristic) in terms of any light source. That is, the difference for the light source #1 is almost equal to that for the light source #2. In the case of the lens #2, however, because the sensitivity is far lower than the standard lens A in the region of short wavelengths, the values of the correction factor for the light sources #1 and #2 differs appreciably from each other. That is, with the light source #1 of low color temperature, the value of the correction factor for the red component R may be smaller than that for the green component G. But, with the light source #2 of high color temperature, it must be increased. In other words, for the lens #2 shown in FIG. 8 which is less sensitive to the blue-rich light source #2 than to the red-rich light source #1, it is under the light source #2 that the spectral characteristic of the lens #2 is more largely corrected than that of the lens #1, and that the red signal must be more largely corrected than the green signal.

Figure 9:
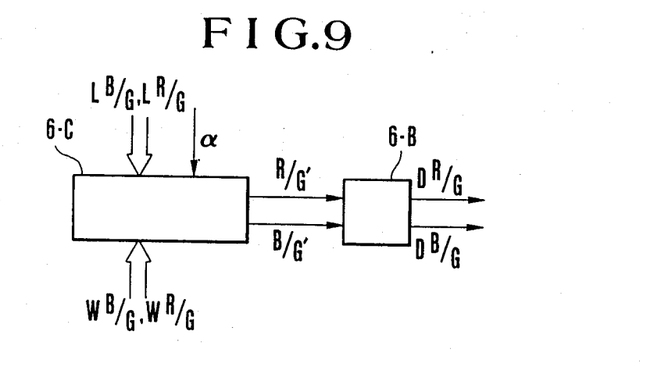
FIG. 9 is a block diagram of the system controller 6 which takes into account the spectral characteristics of the filters and the lens of FIG. 8.

So, we explain another embodiment in which the white balance adjustment to such a lens as shown at #2 is corrected by reference to FIG. 9.

In the first example shown in FIG. 9, along with the data $L^R/_G$, $L^B/_G$ from the lens 1, a correction coefficient $\alpha$ for giving the correction to the data from the lens 1 is transferred to the camera body 2. In the system controller 6 of FIG. 9, therefore, from the aforesaid data $L^R/_G$, $L^B/_G$ and the correction coefficient $\alpha$ and from the data $W^R/_G$, $W^B/_G$ transferred from the sensor 5 for white balance, no matter what light source of different color temperature may be used, the proper white balance adjustment can be assured. FIG. 9 is a block diagram of another example of the system controller 6 as different from that shown in FIG. 7.

In FIG. 9, 6-C is a block in which the control voltage for the R amplifier is derived from the information $L^R/_G$, $L^B/_G$ of the spectral characteristic and the correction coefficient $\alpha$ from the lens 1 and the output $W^R/_G$, $W^B/_G$ of the sensor 5 for white balance. The control signals $^R/_{G'}$ and $^B/_{G'}$ obtainable in this block have their values corrected by the change of the color temperature of the light source. They can be expressed by the following equations (1) and (2).

$$^R/_{G'} = W^R/_G + (W^R/_G \cdot \alpha + L^R/_G) \tag{1}$$

$$^B/_{G'} = W^B/_G + (W^B/_G \cdot \alpha + L^B/_G) \tag{2}$$

Here, as has been described above, the data $W^R/_G$, $W^B/_G$ have the values of the color temperature of the light source determined by the sensor for white balance. Putting, for example, $$W^R/_G = 4 \text{ dB}, L^R/_G = 1 \text{ dB } \alpha = 0.05$$

the terms in the parentheses of equation (1) become $$W^R/_G \cdot \alpha + L^R/_G = 4 \times 0.05 + 1 = 1.2 dB$$

Therefore, we have $^R/_{G'} = 5.2$ dB.

That is, in this case, the $^R/_{G'}$ or the color temperature correction with inclusion of the lens correction is derived by adding the color temperature dependent term ($W^R/_G \times \alpha = 0.2$ dB) to the very term of the lens correction ($=1$ dB). From this, it is understood that the corrected white balance is further adjusted in accordance with the color temperature of the light source when an exposure is made.

6-b is a similar converter to that shown in FIG. 7. By such a correction block 6-C and a converter 6-B, it is made possible to correct the color of the lens depending on the change of the color temperature of the light source when an exposure is made as has been described above.

According to the above-described embodiments, even if the color temperature of the light source with which an object to be photographed is illuminated changes, the white balance can be always properly adjusted.

For note, when to adapt the example of FIG. 9 to the second embodiment of the invention, there is only need to replace the aforesaid $L^R/_G$, $L^B/_G$ by the product of the $L^R/_G$, $L^B/_G$ which depend only on the spectral characteristic of the lens 1 read out from the lens 1 and the $C^R/_G$, $C^B/_G$ which depend only on the spectral characteristic of the camera body 2, or $L^R/_G \times C^R/_G$, $L^B/_G \times C^B/_G$. Such a multiplication is performed in the block 6-C.

Though, in the embodiments of the invention, the memory means for electrically memorizing the total spectral characteristic of the photographic lens with inclusion of the image pickup system of the camera body is made ROM C3, another memory such as bubble memory or magnetic memory may be used. Also, though as the means for reading out the data stored in the memory means use is made of the microcomputer C1 and the interface C2 shown in FIG. 2 which operate according to the flow of FIG. 4, they may otherwise be constructed with another hard logics.

Also, in the second embodiment of the invention, as has been described above, the $L^R/_G$, $L^B/_G$ are memorized in the lens 1, and the $C^R/_G$, $C^B/_G$ are memorized in the camera body 2. Such data are all expressed in the integrated form. Instead of memorizing the data in such integrated form, the data may otherwise be memorized in the form of functions to be integrated, or the equations (2) and (5) so that in the camera body, when the white balance is controlled, the integration is performed after the multiplication by such functions. In this case, the accuracy of white balance control can be improved.

Also, according to the first embodiment of the invention, the following advantage can be produced. That is, if the corresponding data to the spectral characteristic of the image pickup system of the camera body, or $<^R/_G$ camera body, $^R/_G$ camera body$>$ are memorized to the camera body 2 side, while the corresponding data to the spectral characteristic of the photographic lens or $<^R/_G$ lens body, $^B/_G$ lens body$>$ are memorized to the lens 1 side, as in the second embodiment of the invention, there will be some possibility of failing to obtain the accurate total spectral characteristic even by the multiplication of both data.

However, by memorizing the corresponding data to the total characteristic of $<L^R/_G, L^B/_G>$ in the lens 1 as in the first embodiment of the invention, it is made possible to obtain always accurate total spectral characteristic.

What is claimed is:

1. An image pickup system comprising a camera body and an optical image forming unit for detachable joinder to said camera body, said camera body including therein image conversion means and processing circuit means for communication with said optical image forming unit, said optical image forming unit comprising:

(a) lens means for forming an optical image;
(b) memory means for storage of information and containing stored signals indicative of spectral characteristics of both said image conversion means and said lens means; and
(c) circuit means operably responsive to said camera body processing circuit means for generating output signals corresponding to said stored signals.

2. The invention claimed in claim 1 wherein said image conversion means provides electrical signals corresponding to said optical image formed by said lens means, said camera body further including means for adjusting said electrical signals in accordance with said output signals.

3. The invention claimed in claim 2 wherein said image conversion means is a color image pickup means.

4. The invention claimed in claim 3 wherein said adjusting means adjusts the color balance of said electrical signals.

5. The invention claimed in claim 1 wherein said camera body includes electrical terminals, said unit further including electrical terminal means for connection to said terminals when said unit is joined to said camera body.

6. In combination:
(a) a camera body having means for supporting releasable joinder thereto of an image forming unit including lens means for forming an optical image;
(b) memory means in said camera body for the storage of separate signals indicative of spectral characteristics of plural diverse such image forming units; and
(c) processor circuit means in said camera body selectively operable upon joinder to said camera body of any one of said diverse image forming units for selecting from said memory means those stored signals indicative of the spectral characteristics of such one image forming unit.

7. The invention claimed in claim 6 wherein said stored signals are also indicative of spectral characteristics of said camera body.

8. The invention claimed in claim 7 wherein said camera body includes therein image conversion means providing electrical signals corresponding to the optical image formed by said one image forming unit, and further including means for adjusting said electrical signals in accordance with the selected ones of said stored signals.

9. The invention claimed in claim 8 wherein said image conversion means is a color image pickup means.

10. The invention claimed in claim 9 wherein said adjusting means adjusts the color balance of said electrical signals.

11. The invention claimed in claim 6 wherein said camera body includes electrical terminals for electrical connection with said one image forming unit when said one unit is joined to said camera body.

12. In combination:
(a) a plurality of diverse image forming units, each having respective different spectral characteristics and circuit means providing output signals identifying said image forming unit but not said spectral characteristics thereof;
(b) a camera body having means for individual releasable joinder of any one of said image forming units therewith;
(c) memory means in said camera body for the storage of separate signals indicative of spectral characteristics of said plurality of said diverse image forming units; and (d) processor circuit means in said camera body for receiving said image forming unit output signals upon joinder to said camera body of any one of said diverse image forming units and for selecting from said memory means those stored signals indicative of the spectral characteristics of the image forming unit identified by such received output signals.

13. The invention claimed in claim 12 wherein said stored signals are also indicative of spectral characteristics of said camera body.

14. The invention claimed in claim 13 wherein said camera body includes therein image conversion means providing electrical signals corresponding to an optical image formed by said one image forming unit, and further includes means for adjusting said electrical signals in accordance with the selected ones of said stored signals.

15. The invention claimed in claim 14 wherein said image conversion means is a color image pickup means.

16. The invention claimed in claim 15 wherein said adjusting means adjusts the color balance of said electrical signals.

17. The invention claimed in claim 12 wherein said camera body includes electrical terminals, said image forming units each further including electrical terminal means for connection to said terminals when joined to said camera body.

18. In combination:
(a) a camera body having means for supporting releasable joinder thereto of any one of a preselected group of diverse image forming units, each including lens means for forming an optical image and having respective different spectral characteristics;
(b) memory means in said camera body for the storage of signals typically representative of said respective different spectral characteristics of said image forming units; and
(c) processor circuit means in said camera body selectively operable upon joinder to said camera body of any one of said diverse image forming units for retrieving from said memory means such stored signals.

19. The invention claimed in claim 18 wherein said stored signals are also indicative of spectral characteristics of said camera body.

20. The invention claimed in claim 19 wherein said camera body includes therein image conversion means providing electrical signals corresponding to the optical image formed by the lens means of said one image forming unit, and further includes means for adjusting said electrical signals in accordance with the retrieved stored signals.

21. The invention claimed in claim 20 wherein said image conversion means is a color image pickup means.

22. The invention claimed in claim 21 wherein said adjusting means adjusts the color balance of said electrical signals.

23. The invention claimed in claim 18 wherein said camera body includes electrical terminals for electrical connection with said one image forming unit when said one unit is joined to said camera body.

24. An optical image forming unit for detachable joinder to a camera body, said camera body including therein image conversion means and processing circuit means for communication with said optical image forming unit, said optical image forming unit comprising:
(a) lens means for forming an optical image;
(b) memory means for storage of information and containing stored signals indicative of spectral characteristics of both said image conversion means and said lens means; and
(c) circuit means operably responsive to said camera body processing circuit means for generating output signals corresponding to said stored signals.

25. The invention claimed in claim 24 wherein said image conversion means provides electrical signals corresponding to said optical image formed by said lens means, said camera body further including means for adjusting said electrical signals in accordance with said output signals.

26. The invention claimed in claim 25 wherein said image conversion means is a color image pickup means.

27. The invention claimed in claim 26 wherein said adjusting means adjusts the color balance of said electrical signals.

28. The invention claimed in claim 24 wherein said camera body includes electrical terminals, said unit further including electrical terminal means for connection to said terminals when said unit is joined to said camera body.

29. An optical image forming unit for detachable joinder to a camera body, said camera body including therein memory means for the storage of separate signals indicative of spectral characteristics of plural diverse such optical image forming units and processing circuit means for communication with said optical image forming unit while the unit is joined to the camera body, said optical image forming unit comprising:
circuit means for providing output signals identifying said optical image forming unit but not spectral characteristics thereof so as to make said camera body select from said memory means those stored signals indicative of the spectral characteristics of the optical image forming unit identified by such provided output signals.

30. The invention claimed in claim 29 wherein said stored signals are also indicative of spectral characteristics of said camera body.

31. The invention claimed in claim 30 wherein said camera body includes therein image conversion means providing electrical signals corresponding to an optical image formed by said optical image forming unit, and further including means for adjusting said electrical signals in accordance with the selected ones of said stored signals.

32. The invention claimed in claim 31 wherein said image conversion means is a color image pickup means.

33. The invention claimed in claim 31 wherein said adjusting means adjusts the color balance of said electrical signals.

34. The invention claimed in claim 33 wherein said camera body includes electrical terminals, said optical image forming unit further including electrical terminal means for connection to said terminals when joined to said camera body.

* * * * *